US007701107B2

(12) United States Patent
Sagara et al.

(10) Patent No.: US 7,701,107 B2
(45) Date of Patent: Apr. 20, 2010

(54) MOTOR INCLUDING A TEETH SECTION AND A YOKE SECTION WHICH ARE FORMED OF MUTUALLY INDEPENDENT CONFIGURATION MEMBERS

(75) Inventors: Hiroaki Sagara, Kasai (JP); Yukifumi Yamaguchi, Himezi (JP); Takashi Uchino, Kasai (JP); Kazuhiro Tomoshige, Kasai (JP); Keiji Kishimoto, Hirakata (JP); Tetsuji Ueta, Hirakata (JP); Kenji Taguchi, Hirakata (JP)

(73) Assignee: Sanyo Electric Co., Ltd., Moriguchi-Shi (JP)

( * ) Notice: Subject to any disclaimer, the term of this patent is extended or adjusted under 35 U.S.C. 154(b) by 268 days.

(21) Appl. No.: 11/896,505

(22) Filed: Sep. 4, 2007

(65) Prior Publication Data
US 2008/0061653 A1 Mar. 13, 2008

(30) Foreign Application Priority Data

Sep. 8, 2006 (JP) .............................. 2006-243726
Sep. 8, 2006 (JP) .............................. 2006-243728
Sep. 8, 2006 (JP) .............................. 2006-243730

(51) Int. Cl.
*H02K 1/12* (2006.01)
(52) U.S. Cl. .................... 310/216.079; 310/216.086; 310/216.099
(58) Field of Classification Search .......... 310/216.008, 310/26.009, 216.066–216.099, 216.102–216.136
See application file for complete search history.

(56) References Cited

U.S. PATENT DOCUMENTS

| 4,140,935 | A  | * | 2/1979 | Braun et al. ................. 310/224 |
| 6,211,587 | B1 | * | 4/2001 | Enomoto et al. .............. 310/52 |
| 6,700,284 | B2 | * | 3/2004 | Williams et al. ...... 310/216.075 |
| 6,794,786 | B2 | * | 9/2004 | Enomoto et al. ...... 310/216.088 |
| 6,844,653 | B2 | * | 1/2005 | Kolomeitsev et al. . 310/216.082 |

FOREIGN PATENT DOCUMENTS

| JP | 60-046745 | 3/1985 |
| JP | 60-144121 | 7/1985 |
| JP | 61-62537 | 4/1986 |
| JP | 01-303029 | 12/1989 |
| JP | 04-255437 | 9/1992 |
| JP | 07-143718 | 6/1995 |
| JP | 09-327137 | 12/1997 |
| JP | 11-252842 | 9/1999 |
| JP | 2001-258188 | 9/2001 |
| JP | 2004-056915 | 2/2004 |
| JP | 2005-080474 | 3/2005 |
| JP | 2005-117710 | 4/2005 |
| JP | 2006-087244 | 3/2006 |
| JP | 2006-211846 | 8/2006 |

* cited by examiner

*Primary Examiner*—Tran N Nguyen
(74) *Attorney, Agent, or Firm*—Marvin A. Motsenbocker; MOTS Law, PLLC

(57) ABSTRACT

Included are a rotor, and a stator having a yoke section and a teeth section including multiple teeth. The teeth section and the yoke section are made of mutually independent configuration members, and connected to each other. At least one of the teeth section and the yoke section is formed by connecting each neighboring two of its multiple segments arranged one after another in a direction in which the rotor rotates. At least some neighboring teeth out of the multiple teeth are unified.

16 Claims, 18 Drawing Sheets

MOTOR INCLUDING A TEETH SECTION AND A YOKE SECTION WHICH ARE FORMED OF MUTUALLY INDEPENDENT CONFIGURATION MEMBERS

CROSS REFERENCE TO RELATED APPLICATIONS AND INCORPORATION BY REFERENCE

This application is based upon and claims the benefit of priority from prior Japanese Patent Application No. 2006-243726, filed on Sep. 8, 2006; prior Japanese Patent Application No. 2006-243728, filed on Sep. 8, 2006, and prior Japanese Patent Application No. 2006-243730, filed on Sep. 8, 2006, the entire contents of which are incorporated herein by reference.

BACKGROUND OF THE INVENTION

1. Field of the Invention

The present invention relates to a motor including a stator which has a yoke section and a teeth section.

2. Description of the Related Art

Motors of a type including a stator having a yoke section and a teeth section which are unified of a single part have been heretofore familiar. In general, a motor of this type includes the teeth section with multiple teeth provided at regular distance in a direction in which the motor rotates, and the teeth are inserted respectively into coils each made of a metal wire such as a copper wire. In this respect, the coils of the motor are produced by winding a metal wire around the respective teeth of the teeth section by use of an automated machine such as a wire winding machine.

In addition, motors of a type including a stator configured of a yoke section and a teeth section with multiple teeth, which are independent configuration members, have been familiar. In the process of manufacturing a motor of this type, each of the yoke section and the teeth section is formed into an annular-shaped single part. Thereafter, the teeth of the teeth section are inserted into the respective coils which have been already made by wire winding. Afterward, the yoke section and the teeth of the teeth section are fitted to each other. Thereby, a stator is produced.

Because the teeth of the teeth section are inserted into the coils which have been already made by wire winding in this manner, there is no more need for a space, which is used for a wire-winding nozzle for winding a coil, between each two neighboring teeth. This makes it possible to increase the area of each space in which a coil is provided. This increase results in enhancement of a space factor of each coil.

Furthermore, in the case of the motors of the foregoing type, the teeth section is produced by laminating multiple teeth plates of the same shape in a way that the teeth are connected to each other in one teeth plate.

In addition, examples described as motors of the foregoing type include teeth which are separated by cutting out each of the teeth and the teeth section after the two sections are connected to each other.

In the case of motors of the foregoing type, insertion grooves are formed and extended in the entire area of the yoke section in a direction in which the rotational axis of the rotor runs. That is because the insertion-groove-forming parts are formed in all of the yoke plates laminated into the yoke section.

SUMMARY OF THE INVENTION

A characteristic of the present invention is as follows: a motor includes a rotor, and a stator which includes a yoke section and a teeth section having multiple teeth; the teeth section and the yoke section are respectively made of mutually independent configuration members, and are connected to each other; at least one of the teeth section and the yoke section is formed by connecting its multiple segments, which are arranged one after another in a direction in which the rotor rotates; and at least some neighboring teeth out of the multiple teeth are unified.

Another characteristic of the present invention is as follows: a motor includes a rotor, and a stator which includes a yoke section and a teeth section having multiple teeth as well as a plurality connecting part; the teeth section and the yoke section are respectively made of mutually independent configuration members, and are connected to each other; and at least some neighboring teeth out of the multiple teeth are unified with each neighboring two teeth to each other through their respective parts which are closer to the rotor than their respective coils in a direction in which the rotational axis of the rotor runs.

Yet another characteristic of the present invention is as follows: a motor includes a case including closing portions for closing one end portions of their respective insertion grooves, and a stator which has a yoke section in which insertion grooves are formed and which includes closing walls, and a teeth section including multiple teeth; the teeth section and the yoke section are respectively made of mutually independent configuration members, and are connected to each other; at least some neighboring teeth out of the multiple teeth are unified by connecting each neighboring two teeth to each other by use of a connecting part; insertion grooves to which parts of the teeth section are inserted so that the yoke section and the teeth section are connected to each other; and closing walls are for closing end portions of their corresponding insertion grooves.

DETAILED DESCRIPTION OF THE INVENTION

Figure 1:
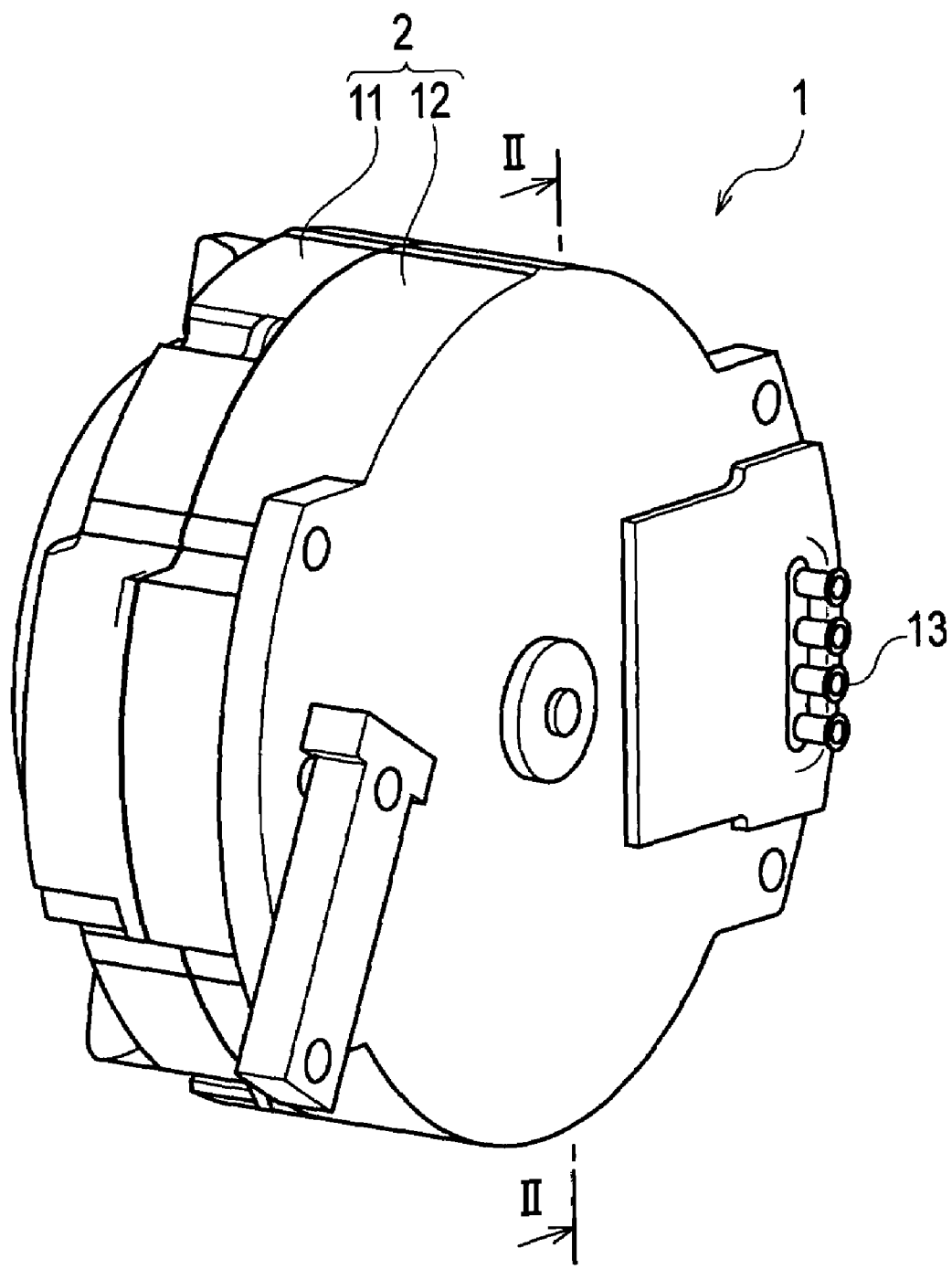
FIG. 1 is an overall perspective view of a brushless motor according to an embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

Descriptions will be hereinafter provided for an embodiment of the present invention with reference to the drawings. It should be noted that this embodiment is an application of the present invention to a three-phase inner rotor type brushless motor to which a tire of an electric motorcycle is attached.

Figure 2:
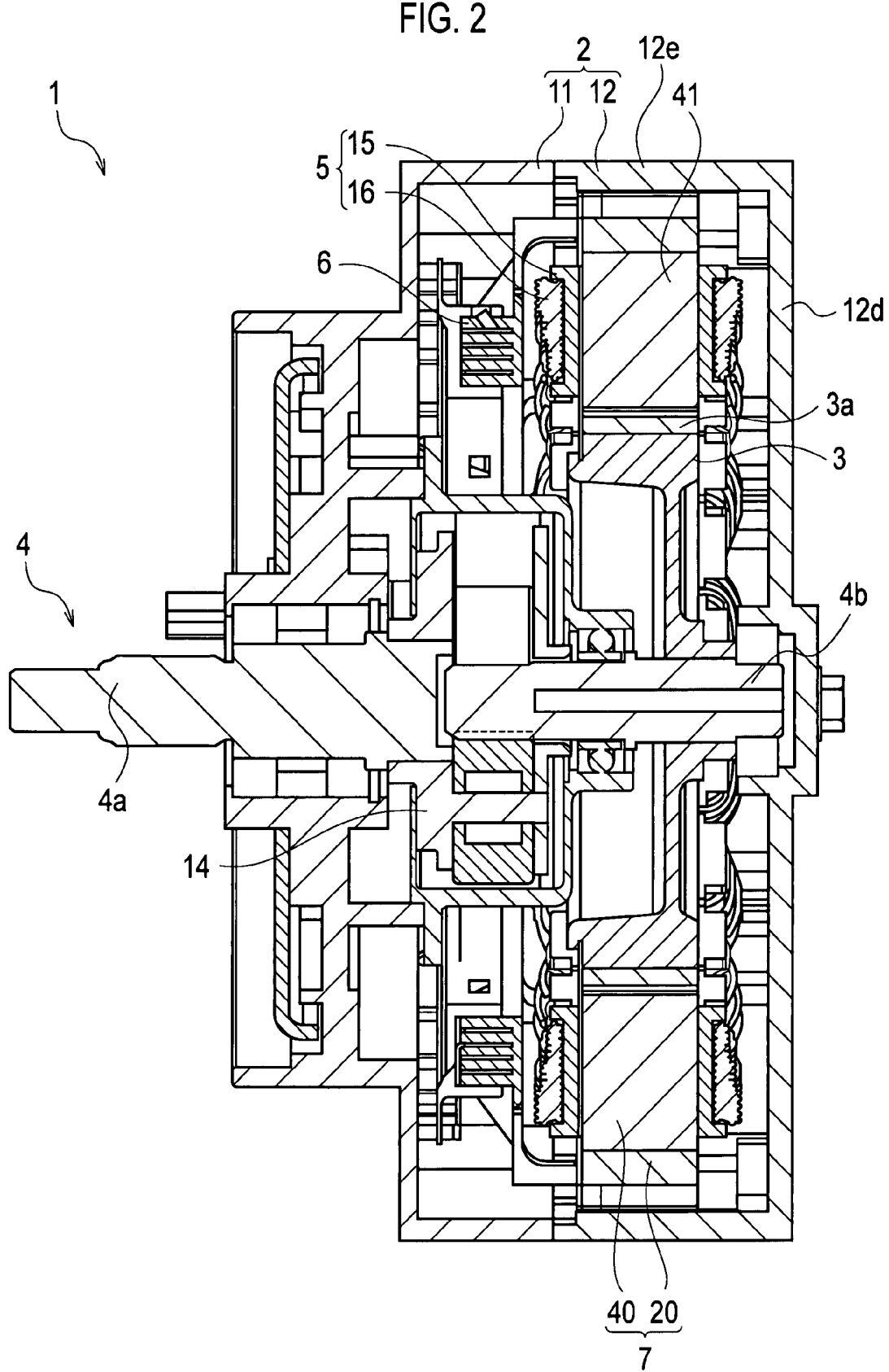
FIG. 2 is a cross-sectional view of the brushless motor taken along the II-II line of FIG. 1.
Figure 3:
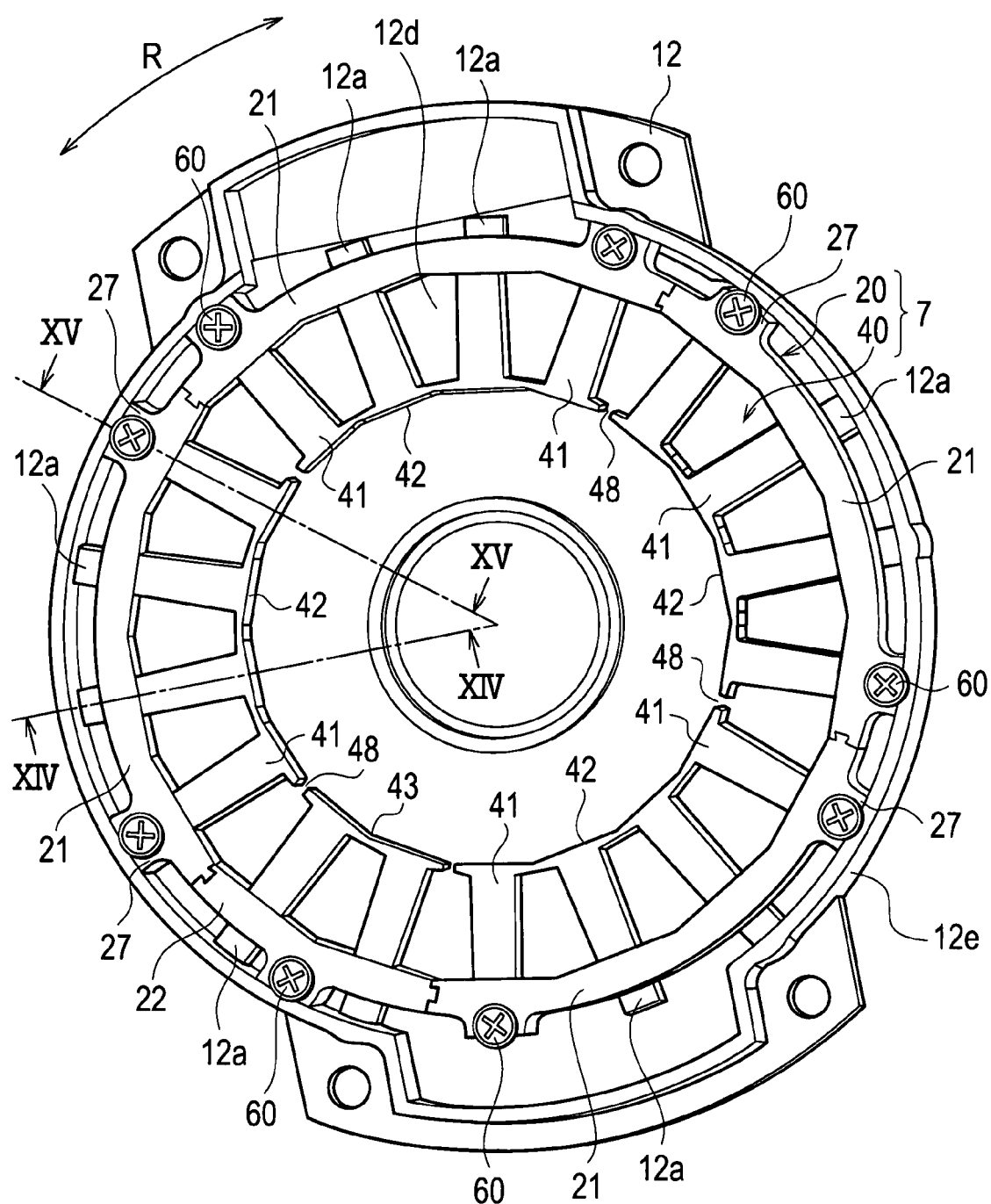
FIG. 3 is a perspective view of a stator attached to a case.
Figure 4:
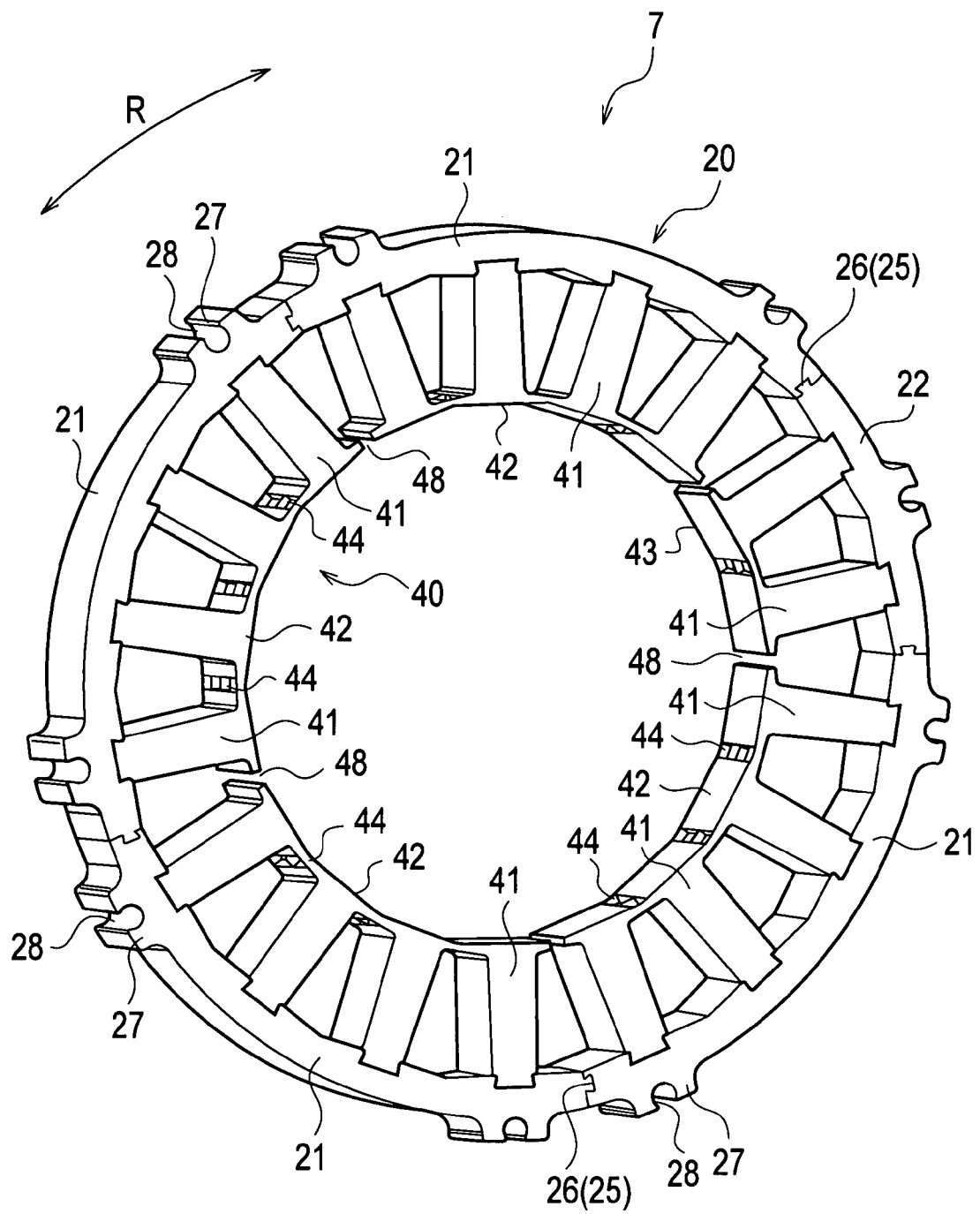
FIG. 4 is another perspective view of the stator.
Figure 5:
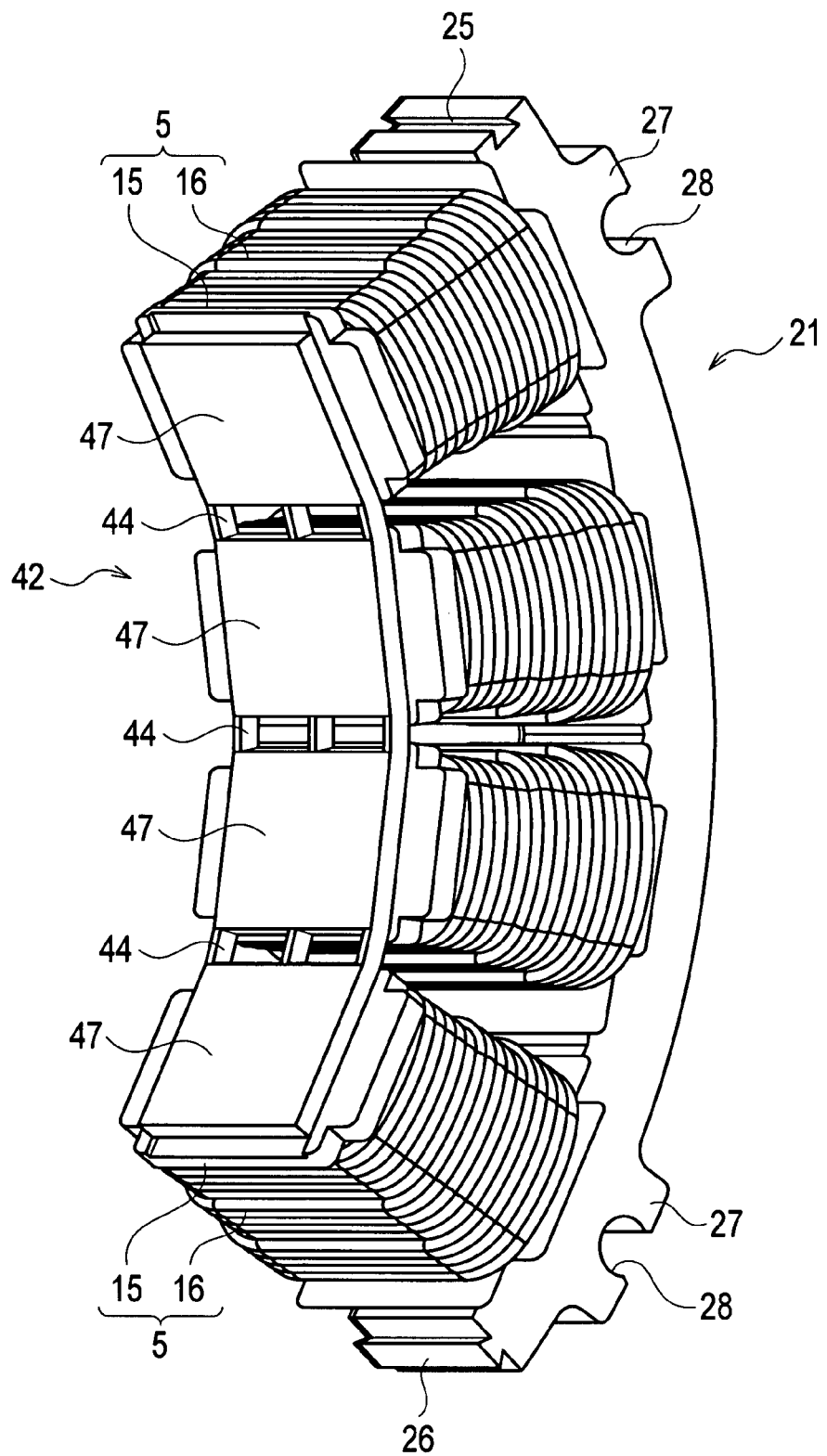
FIG. 5 is a perspective view of a segment of the stator, to which stator coils are attached.
Figure 6:
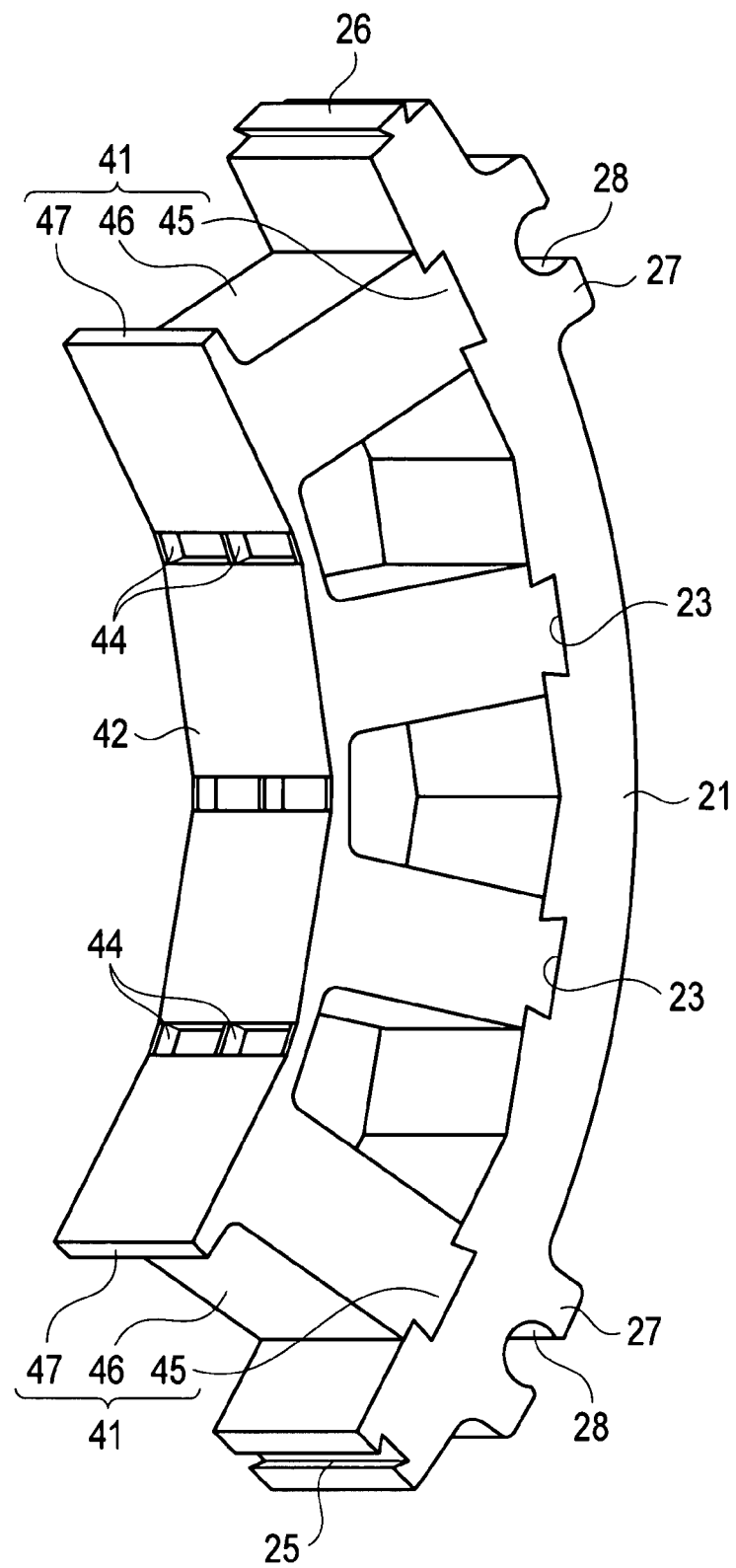
FIG. 6 is another perspective view of the segment of the stator.
Figure 7:
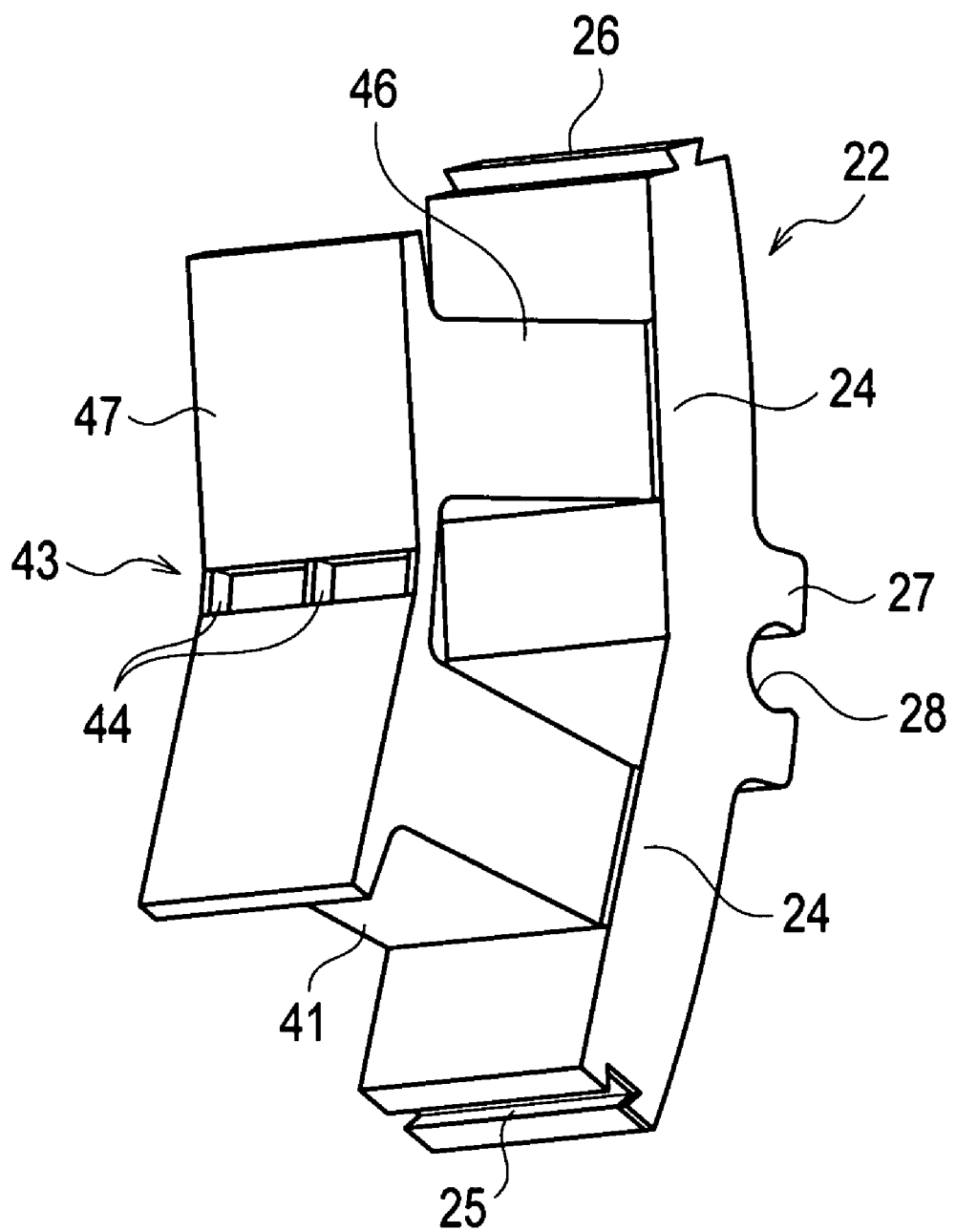
FIG. 7 is a perspective view of the other segment of the stator.
Figure 8:
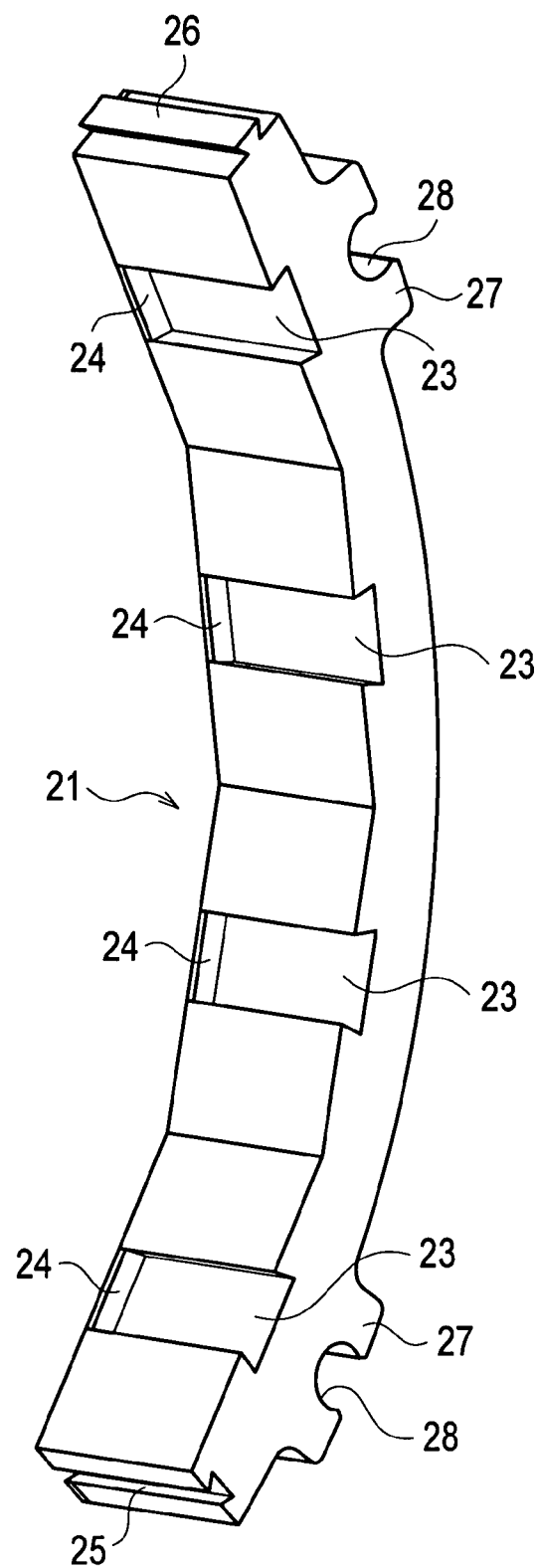
FIG. 8 is a perspective view of a yoke segment.

FIG. 1 is an overall perspective view of the brushless motor according to the present embodiment. FIG. 2 is a cross-sectional view of the brushless motor taken along the II-II line of FIG. 1. FIG. 3 is a perspective view of a stator attached to a case. FIG. 4 is another perspective view of the stator. FIG. 5 is a perspective view of a segment of the stator, to which stator coils are attached. FIGS. 6 and 7 are perspective views of a segment of the stator. FIG. 8 is a perspective view of a yoke segment.

Figure 9:
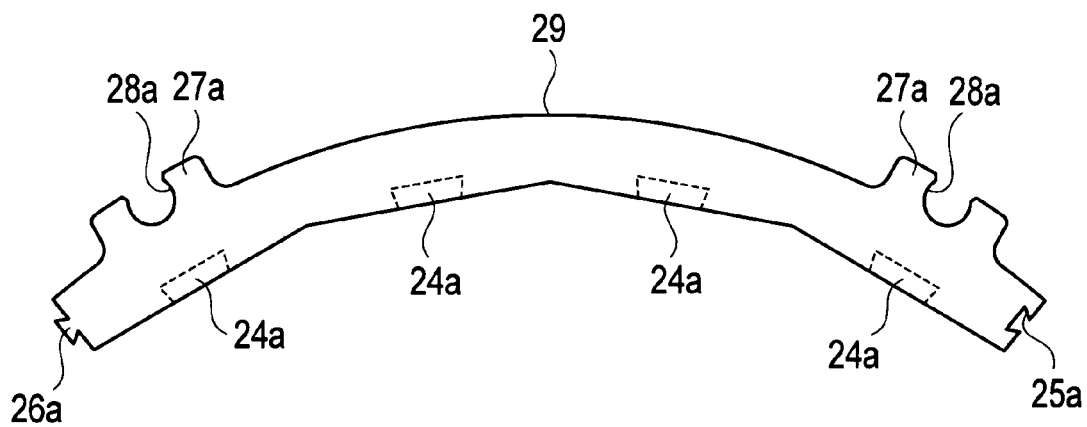
FIG. 9 is a plan view of a yoke plate.
Figure 10:
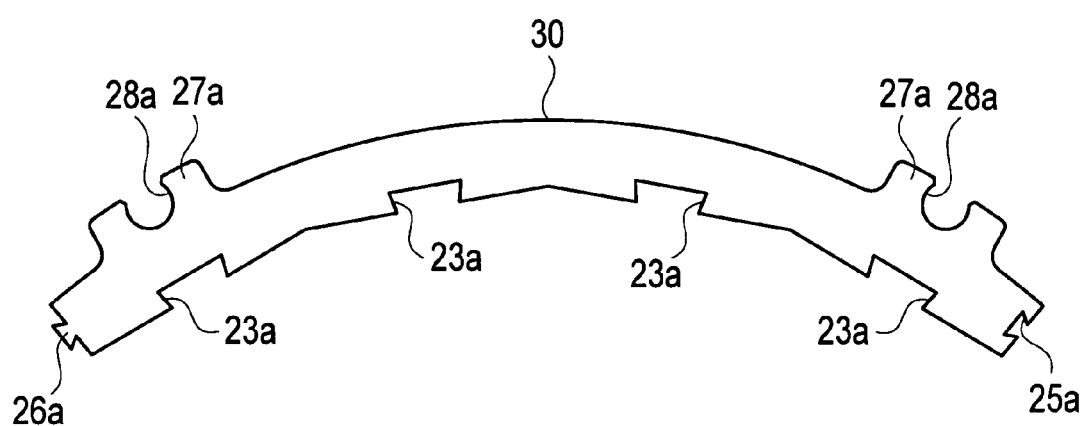
FIG. 10 is a plan view of the other yoke plate.
Figure 11:
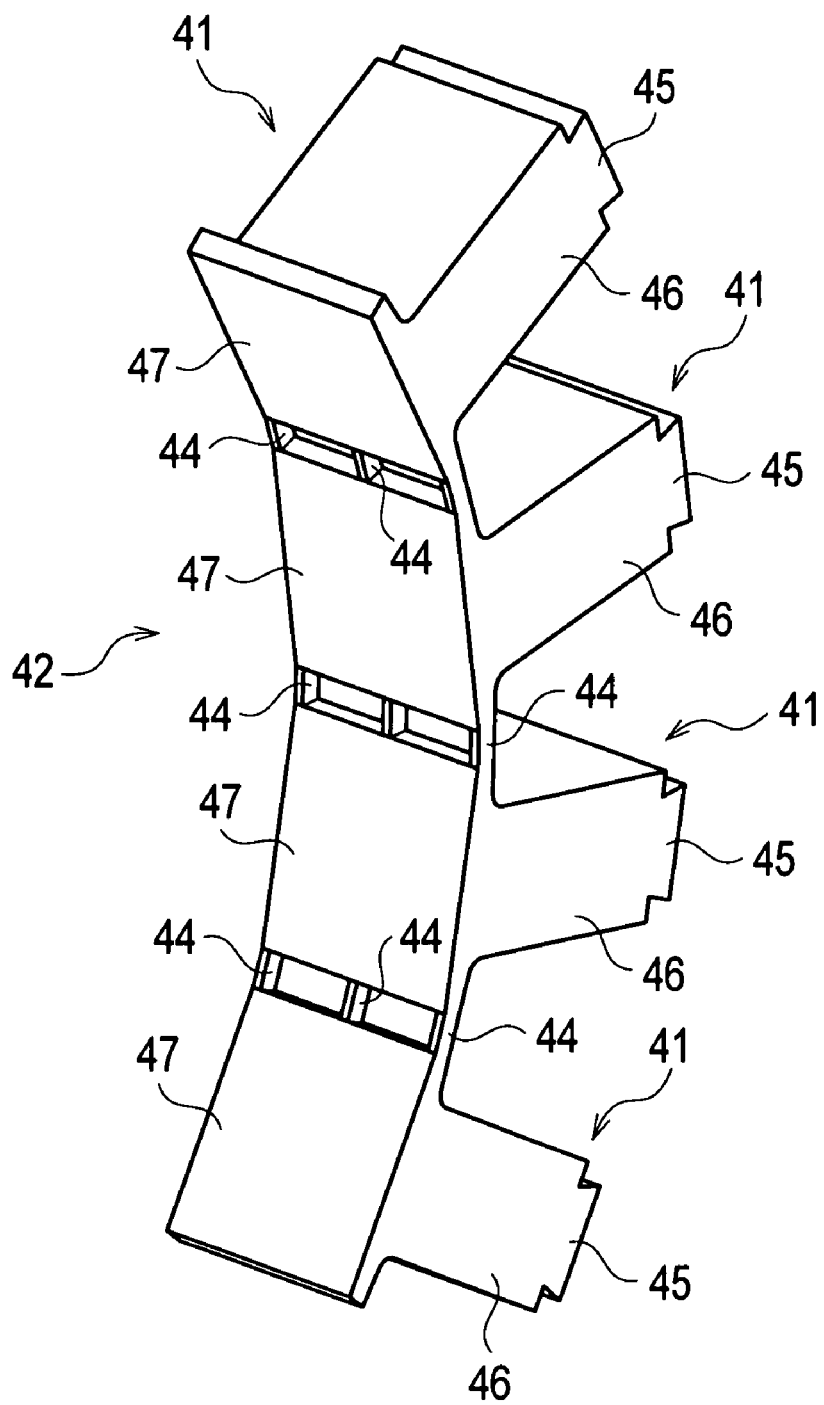
FIG. 11 is a perspective view of a teeth segment.
Figure 12:
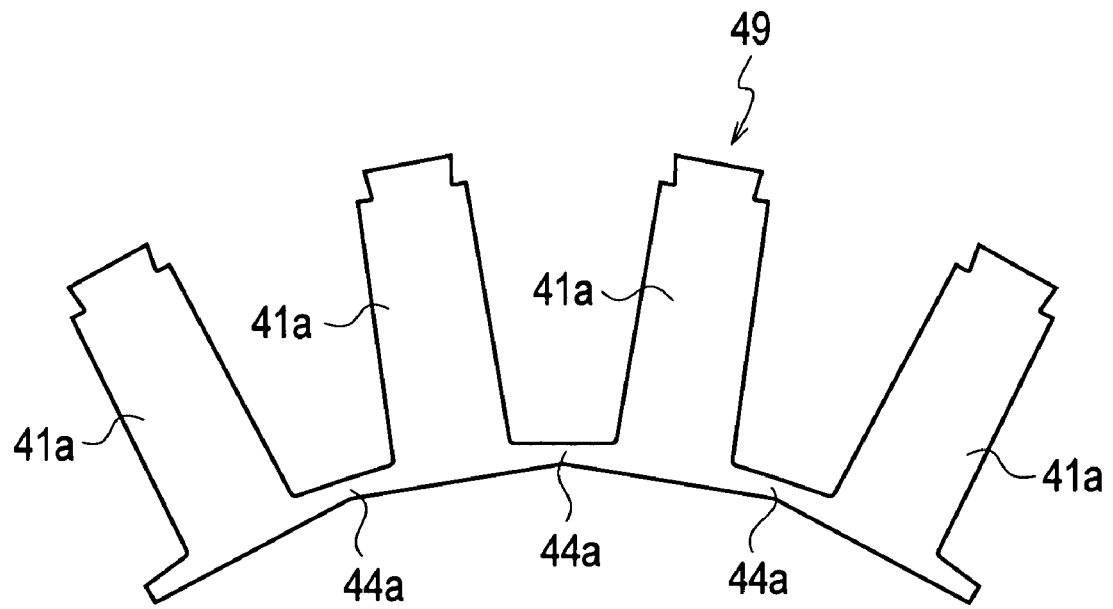
FIG. 12 is a plan view of a teeth plate.
Figure 13:
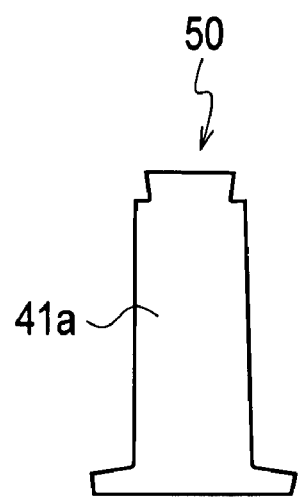
FIG. 13 is a plan view of a tooth plate.
Figure 14:
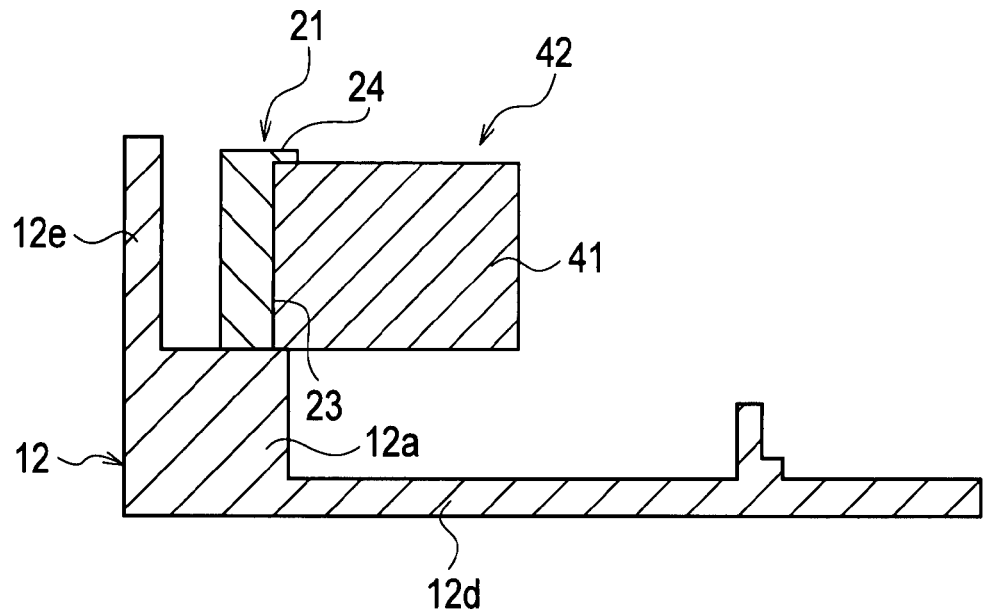
FIG. 14 is a cross-sectional view of the stator taken along the XIV-XIV line of FIG. 3.
Figure 15:
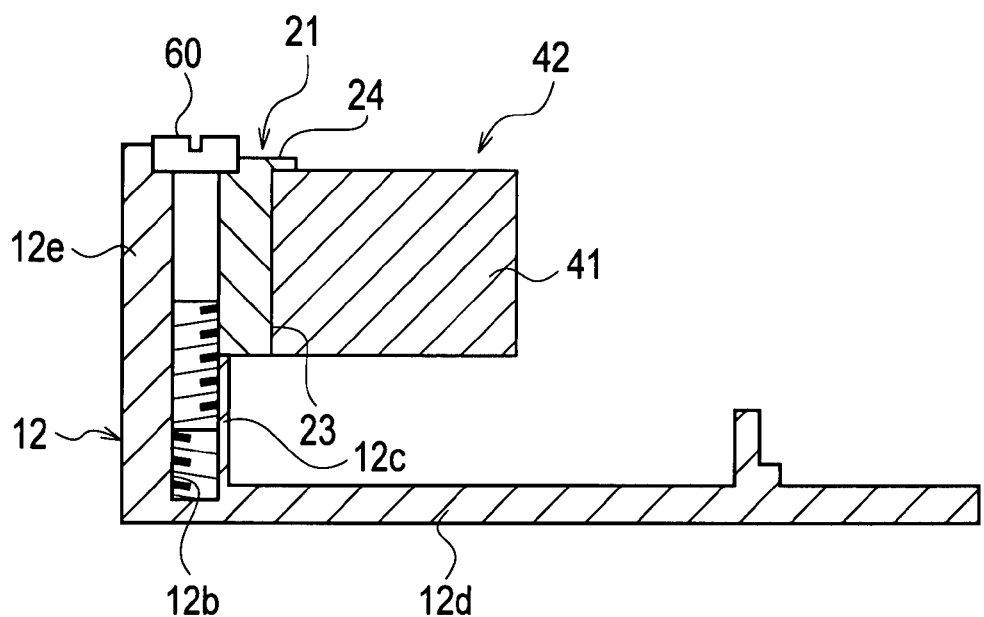
FIG. 15 is a cross-sectional view of the stator taken along the XV-XV line of FIG. 3.

FIGS. 9 and 10 are plan views of a yoke plate. FIG. 11 is a perspective view of a teeth segment. FIGS. 12 are plan views of a teeth plate. FIGS. 13 are plan views of a tooth plate. FIG. 14 is a cross-sectional view of the stator taken along the XIV-XIV line of FIG. 3. FIG. 15 is a cross-sectional view of the stator taken along the XV-XV line of FIG. 3. It should be noted that the illustration of the stator coils are omitted from FIGS. 3, 4, 6 and 7.

As shown in FIGS. 1 and 2, a brushless motor 1 includes a case 2, a rotor 3, a shaft 4, stator coils 5, a bus ring 6 and a stator 7.

The case 2 consists of aluminum-made case segments 11 and 12 which are fixed to each other with bolts (not illustrated). As shown in FIG. 1, input and output terminals 13 are provided to a part of the outer peripheral surface of the case segment 12. It should be noted that the illustration of the input and output terminals 13 are omitted from FIG. 2 for convenience.

As shown in FIGS. 3 and 14, ten closing ribs (equivalents to closing portions according to claims) 12a are formed in the inner bottom surface (inner side surface) 12d of the case segment 12 in a way that the 10 closing ribs protrude in an integrated manner, and in a way that the 10 closing ribs 12a extend toward the center of the inner bottom surface 12d from the outer peripheral edge portion thereof. Each of the closing ribs 12a closes an end of one of press-fit grooves 23 in a corresponding one of yoke segments 21 and 22 of the stator 7, and thus presses a corresponding one of teeth segments 42 and 43, although the yoke segments 21 and 22 will be described later. In addition, as shown in FIGS. 3 and 15, nine fixing parts 12c are formed in the outer peripheral portion of the inner bottom surface 12d of the case segment 12. Each of the fixing parts is provided with a screw hole 12b into which a fixing screw 60 for fixing the stator 7 to the case segment 12 is screwed.

As shown in FIG. 2, the outer peripheral portion of the rotor 3 is provided with multiple magnets 3a. The shaft 4 to which a tire is attached is pressed to fit into the inner peripheral portion of the rotor 3. The shaft 4 includes a shaft segment 4a to which the tire is attached, and a shaft segment 4b to which the rotor 3 is attached. The shaft segments 4a and 4b are connected to each other with a planetary gear for deceleration.

As shown in FIGS. 2 and 5, each of the stator coils 5 has a configuration in which a copper wire 16 is wound around a tubular insulator 15 into which a corresponding one of teeth 41 is inserted. The bus ring 6 has four brass plates corresponding to three phases and a neutral point of each of the stator coils 5, and electrically connects the stator coils 5 with wires.

Descriptions will be subsequently provided for the stator 7 which is a part characteristic of the present embodiment. As shown 3, the stator 7 is fixed to the inside of the case segment 12 of the case 2. As shown in FIGS. 3 to 7, the yoke segments 21 of a yoke section 20 are connected respectively to the teeth segments 42 of a teeth section 40 whereas the yoke segment 22 of the yoke section 20 is connected to the teeth segment 43 of the teeth section 40, and the yoke segments 21 and 22 and the teeth segments 42 and 43 are independent configuration members. The stator 7 has a configuration in which each neighboring two of the yoke segments 21 and 22 are connected to each other. In this respect, the number of the yoke segments 21 is equal to the number of the teeth segments 42 whereas the number of the yoke segment 22 is equal to the number of the teeth segment 43, and the yoke segments 21 are connected to the teeth segments 42 on a one-to-one basis whereas the yoke segment 22 is connected to the teeth segment 43 on a one-to-one basis, as is clear from FIG. 4. With this configuration, each of the teeth segments 42 and 43 are connected to a corresponding one of the yoke segments 21 and 22 in a way that each of the teeth segments 42 and 43 is not connected to neighboring two of the yoke segments 21 and 22 at the same time.

As shown in FIGS. 3 and 4, the yoke section 20 is formed in a substantially cylindrical shape by connecting each neighboring two of 4 substantially arc-shaped yoke segments 21 and one substantially arc-shaped yoke segment 22 to each other in a loose fitting manner. From now on, detailed descriptions will be provided for the yoke segments 21, and brief descriptions will be provided for the yoke segment 22 which has almost all the same configuration as the yoke segments 21 has except that the yoke segment 22 is different from the yoke segments 21 in the length in a direction in which the rotor 3 rotates (hereinafter referred to as a "rotational direction R").

As shown in FIG. 8, four press-fit grooves 23 (equivalents to insertion grooves according to claims) which extend in a direction in which the rotational axis of the rotor 3 runs (hereinafter referred to as a "rotational axis direction") are formed in the inner periphery of each of the yoke segments 21. A closing wall 24, which closes an end of a corresponding one of the press-fit grooves 23, and which is capable of pressing a corresponding one of the teeth segments 42, is formed in an end portion of the press-fit groove 23. Each of the press-fit grooves 23 is formed in a way that a plan view of the press-fit groove 23 looks like a trapezoid having a side closer to the inner periphery which is shorter than a side closer to the outer periphery, for the purpose of preventing a corresponding one of the teeth segments 42 from coming off toward the center of the case 2.

A fitting groove 25 is formed in an end portion of each of the yoke segments 21 in the rotational direction R. A fitting projected portion 26, which is capable of being loosely fitted into the fitting groove 25 of a neighboring one of the yoke segments 21 and 22, is formed in the other end portion of the yoke segment 21 in the rotational direction R. It should be noted that the fitting groove 25 and the fitting projected portion 26 are loosely fitted to each other in a way that, for example, a gap of approximately 0.03 mm is formed between the fitting groove 25 and the fitting projected portion 26. The yoke section 20 is formed by loosely fitting the yoke segments 21 and 22 one to another in a way that the fitting projected portion 26 of one of the yoke segments 21 and 22 is fitted into the fitting groove 25 of a neighboring one of the yoke segments 21 and 22.

Two guide portions 27, which abut on the inner surface of the outer peripheral portion 12e of the case segment 12 for the purpose of positioning the stator 7, are formed in the outer peripheral portion of the yoke segment 21. In addition, a partially arc-shaped concave portion 28, through which a corresponding one of the fixing screws 60 for fixing the stator 7 passes, is formed in each of the guide portions 27. It should be noted that partially arc-shaped concave portions (their illustrations are omitted), each of which forms a circle along with a corresponding one of the concave portions 28, are formed in positions in the case segment 12, the positions corresponding to the respective concave portions 28.

Each yoke segment 21 has a configuration in which yoke plates (equivalents to first yoke plates according to claims) 29 as shown in FIG. 9 and yoke plates (equivalents to second yoke plates according to claims) 30 as shown in FIG. 10 are laminated. The yoke plates 29 and the yoke plates 30 are of two different kinds, and are each made of an iron plate with a thickness of approximately 0.5 mm. Each of the yoke plates 29 and 30 has a fitting groove forming part 25a constituting the fitting groove 25, a fitting projected portion forming part 26a constituting the fitting projected portion 26, a guide portion forming part 27a constituting the guide portion 27, and a concave portion forming part 28a constituting the concave portion 28. Moreover, a closing-wall-forming part 24a constituting the closing wall 24 is formed in each of the yoke plates 29, and a press-fit groove forming part 23a constituting the press-fit groove 23 is formed in each of the yoke plates 30. In each of the yoke segments 21, the yoke plates 29 and the yoke plates 30 are caulked and fixed to each other in a way that two yoke plates 29 are laminated and 50 yoke plates 30 are laminated on the two laminated yoke plates 29. In other words, each closing wall 24 is configured of the closing-wall-forming parts 24a of the two respective yoke plates 29.

Brief descriptions will be provided next for the yoke segment 22 with reference to FIG. 7. The yoke segment 22 is provided with two press-fit grooves 23 and two closing walls 24. In response to this, the yoke segment 22 is formed so that the length of the yoke segment 22 in the rotational direction R is shorter than the length of the yoke segment 21 in the rotational direction R. Furthermore, the yoke segment 22 also has a configuration in which yoke plates (their illustrations are omitted) each having a closing-wall-forming part 24a formed therein and yoke plates (their illustrations are omitted) each having a press-fit groove forming part 23a formed therein are laminated.

As shown in FIGS. 3 and 4, the teeth section 40 has 18 teeth 41, and includes four teeth segments 42 and one teeth segment 43. Detailed description will be provided below for the teeth segments 42, and brief descriptions will be provided for the teeth segment 43 which has almost all the same configuration as the teeth segments 42 except that the teeth segment 43 is different from the teeth segments 42 in the length in the rotational direction R.

As shown in FIG. 11, each of the teeth segments 42 has four teeth 41 and connecting parts 44. Each of the teeth 41 is configured of a press-fit projected portion 45; a coil supporting portion 46 shaped like a quadrangular prism, which is inserted into a corresponding stator coil 5; and a front end portion 47 provided inward of the stator coil 5. The press-fit projected portion 45 is formed to have a shape which enables the press-fit projected portion 45 to be pressed to fit into a corresponding press-fit groove 23 of the yoke section 20 without a clearance between the press-fit projected portion 45 and the press-fit groove 23. The width of the press-fit projected portion 45 in the rotational direction R is formed to be narrower than the width of the coil supporting portion 46 in the rotational direction R so that the press-fit projected portion 45 should not obstruct the insertion of the coil supporting portion 46 into the stator coil 5.

The front end portion 47 is formed in the shape of a flat plate which is as thick in the rotational axis direction as the coil supporting portion 46, and which is wider in the rotational direction R than the coil supporting portion 46. In each of the teeth segments 42, front end portions 47 of each two neighboring teeth 41 are unified by connecting parts 44 in the rotational axis direction of an end of the front end portion 47 of one tooth 41 in the rotational direction R to corresponding parts in the rotational axis direction of an end of the front end portion 47 of the other tooth 41 with the respective connecting parts 44. In addition, as shown in FIGS. 3 and 4, a gap 48 is formed between the front end portions 47 respectively of the outermost teeth 41 of each two neighboring teeth segments 42. The inner peripheral surface of each front end portion 47 is formed to have a flat surface which is normal to the radius at which the rotor 3 rotates. Thereby, in the inner peripheral surface of each of the front end portions 47, the distance between the rotor 3 and each of the two end portions of the inner peripheral surface in the rotational direction R where the lines of magnetic force changes more while the rotor 3 is rotating is longer than the distance between the rotor 3 and the center portion in the inner peripheral surface in the rotational direction R where the lines of magnetic force changes less while the rotor 3 is rotating.

As shown in FIG. 11, three connecting parts 44 are provided between the front end portions 47 respectively of each two neighboring teeth 41. The three connecting parts 44 between each two neighboring teeth 41 are formed by placing a regular distance between the connecting part 44 in the center of the front end portion 47 in the rotational axis direction and each of the connecting parts 44 in the respective two end portions of the front end portion 47 in the rotational axis direction in order that a space passing through between each two neighboring connecting parts 44 in the same direction as the radius of the stator 7 extends can be formed between the two neighboring connecting parts 44.

Each of the teeth segments 42 has a configuration in which teeth plates (equivalents to first teeth plates according to claims) 49 and teeth plates (equivalents to second teeth plates according to claims) 50 are laminated. The teeth plates 49 and the teeth plates 50 are of two different kinds, and are each made of an iron plate with a thickness of approximately 0.5 mm. Four tooth-forming parts 41a respectively constituting the four teeth 41 and three connecting-part-forming parts 44a respectively constituting the three connecting parts 44 for connecting four tooth-forming parts 41a are formed in each of the teeth plates 49. On the other hand, each of the teeth plates 50 is configured of only a tooth-forming part 41a constituting a tooth 41. In each teeth segment 42, the teeth plates 49 and 50 are caulked and fixed to one another in a way that two teeth plates 49, 23 teeth plates 50, two teeth plates 49, 23 teeth plates 50 and two teeth plates 49 are sequentially laminated. Specifically, each connecting part 44 is formed of corresponding connecting-part-forming parts 44a of the respective two teeth plates 49. In each of layers in a laminating direction, four teeth plates 50 are placed corresponding position of the respective four teeth 41, and 23 layers, which have four teeth plates 50 are laminated.

Brief descriptions will be provided next for the teeth segment 43 with reference to FIG. 7. The teeth segment 43 has only two teeth 41. In response to this, the length of the teeth segment 43 in the rotational direction R is formed shorter than the length of teeth segments 42 in the rotational direction R. Furthermore, the teeth segment 43 similarly has a configuration in which teeth plates each having tooth-forming parts 41a and a connecting-part-forming part 44a formed (their illustrations are omitted) as well as teeth plates each configured of only a tooth-forming part 41a (their illustration are omitted) are laminated.

Descriptions will be provided next for how the stator 7 is attached to the case segment 12 of the case 2 with reference to FIGS. 3, 14 and 15.

As shown in FIG. 14, in each of parts of the case segment 12 in which the respective closing ribs 12a are formed, one end surface of each teeth 41 is pressed by a corresponding one of the closing walls 24 which is formed in one end portion of a corresponding one of the press-fit grooves 23 of the yoke section 20 whereas the other end surface of the teeth 41 is pressed by a corresponding one of the closing ribs 12a of the case segment 12 which is provided to the other end portion of the press-fit groove 23, while the stator 7 is fixed to the case segment 12 by use of a corresponding one of the fixing screws 50 (see FIG. 15). This makes it possible to prevent each of the teeth sections 40 from coming off from the yoke section 20.

As shown in FIG. 3, the 18 teeth 41 are formed in the teeth section 40 whereas only the 10 closing ribs 12a are formed in the case segment 12. It should be noted, however, that even 10 closing ribs 12a are capable of preventing all of the teeth segments 42 and 43 from coming off. That is because the closing ribs 12a are arranged in a way that each of the teeth segments 42 and 43 are pressed by corresponding two of the closing ribs 12a.

In parts of the yoke 20 in which the guide portions 27 are formed, the outer peripheral surface of each of the guide portions 27 abuts on the inner surface of the outer peripheral portion 12e of the case segment 12. Thereby, the yoke section 20 is positioned. Moreover, as shown in FIG. 15, the fixing screws 60 inserted into the respective concave portions 28 of the guide portion 27 are screwed in their corresponding screw holes 12b formed in the case segment 12. Thereby, the yoke section 20 along with the teeth section 40 is fixed to the case segment 12.

Brief descriptions will be provided next for a brushless motor manufacturing process while focusing on a step of assembling a stator and a step of attaching the stator to a case segment.

First of all, the yoke plates 29 as shown in FIG. 9, which constitute the yoke segments 21, are produced by punching out an iron plate with a thickness of approximately 0.5 mm by use of corresponding dies. Subsequently, areas corresponding to the respective closing-wall-forming parts 24a in each yoke plate 29 are punched out. Thereby, the yoke plates 30 as shown in FIG. 10, each of which has the press-fit groove forming parts 23a formed, are produced. Thereafter, the yoke plates 29 and 30 are laminated and thus caulked. By this, each of the yoke segments 21 as shown in FIG. 8 is produced. Similarly, the yoke segment 22 is produced.

Afterward, the teeth plates 49 as shown in FIG. 12 and the teeth plates 50 as shown in FIG. 13, which constitute the teeth segments 42, are produced by punching out an iron plate with a thickness of approximately 0.5 mm by use of corresponding dies. Subsequently, these teeth plates 49 and 50 are laminated and thus caulked. By this, each of the teeth segments 42 as shown in FIG. 11 is produced. Similarly, the teeth segment 43 is produced.

Thereafter, the coil supporting portions 46 respectively of the teeth 41 are inserted into the corresponding stator coils 5 each already formed by winding the copper wire 16 around the corresponding insulator 15. Subsequently, the press-fit projected portions 45 of the respective teeth 41 in one of the teeth segments 42 (43) are pressed fit into the corresponding press-fit grooves 23 of a corresponding one of the yoke segments 21 (22) from the corresponding open ends each with no closing wall 24 formed. Afterward, the teeth segment 42 (43) is connected to the yoke segment 21 (22). After that, the open ends with no closing wall 24 formed are opposed to the inner bottom surface 12d of the case segment 12. Subsequently, the guide portions 27 of the yoke segment 21 (22) are caused to abut on the inner surface of the outer peripheral portion 12e of the case segment 12. Concurrently, the yoke segment 21 (22) is positioned in a way that the screw holes 12b in the case segment 12 agree with their corresponding concave portions 28 in the guide portions 27. In this manner, the yoke segment 21 (22) along with the teeth segment 42 (43) are arranged.

Thereafter, the other teeth segments 42 and 43 as well as the other yoke segments 21 and 22 are sequentially arranged while the teeth segments 42 and 43 are being pressed to fit into, and connected to, the corresponding yoke segments 21 and 22. Afterward, each neighboring two of the yoke segments 21 and 22 are connected to each other in a loose fitting manner by use of their fitting groove 25 and fitting projected portion 26. After that, all of the yoke segments 21 and 22 as well as all of the teeth segments 42 and 43 are arranged inside the case segment 12, and are thus connected to the case segment 12. Subsequently, the fixing screws 60 inserted into the respective concave portions 28 in each of the yoke segments 21 and 22 are screwed into the corresponding screw holes 12b. Thus, the stator 7 is fixed to the case segment 12.

Finally, the remaining parts including the rotor 3 and the shaft 4 are attached to the case 2. Thereby, the brushless motor 1 is completed.

In the case of the brushless motor 1 according to the present embodiment, as described above, the yoke section 20 and the teeth section 40 are respectively configured of the mutually independent configuration members. This configuration makes it possible to insert the teeth 41 of the teeth section 40 into the corresponding stator coils 5 each already formed by winding the corresponding wire, and to accordingly increase the space factor.

Furthermore, in the case of the brushless motor 1, the yoke section is configured of the five yoke segments 21 and 22, each neighboring two of which are connected to each other in the loose fitting manner. This configuration makes it possible to easily assemble the stator 7 by causing the fitting groove 25 and the fitting projected portion 26 in each loose fitting section to absorb distortion between the yoke section 20 and the teeth section 40. In addition, this configuration makes it possible to check loss of the lines of magnetic force between each neighboring two of the yoke segments 21 and 22 in comparison with a configuration in which the yoke segments are separated from one another.

Moreover, in the case of the brushless motor 1, the gap 48 is formed between each neighboring two of the teeth segments 42 and 43 which constitute the teeth section 40. This formation makes it possible to easily assemble the stator 7 by causing the gaps 48 to absorb distortion of the yoke section 20 and the teeth section 40. Concurrently, this formation makes it possible to check leakage of the lines of magnetic force between each neighboring two of the teeth segments 42 and 43 by use of the gaps 48.

Additionally, in the case of the brushless motor 1, the yoke section 20 is configured of the 5 yoke segments 21 and 22. This configuration causes the yoke plates 29 and the yoke plates 30 to be formed almost straight. The production of almost straight yoke plates makes it possible to increase the yield of producing yoke plates from each iron plate in comparison with the production of circular yoke plates without dividing each of the circular yoke plates into segments. Similarly, the teeth section 40 is configured of the 5 teeth segments 42 and 43, and this makes it possible to increase the yield of producing teeth plates from each iron plate.

Furthermore, the brushless motor 1 has the configuration in which each of the yoke segments 21 is paired with its corresponding one of the teeth segments 42 whereas the yoke segment 22 is paired with the teeth segment 43, and in which the teeth segments 42 and 43 as well as the yoke segments 21 and 22 are accordingly arranged in the way that any one of the teeth segments 42 and 43 is not connected to two or more neighboring yoke segments 21 and 22 at the same time. This configuration makes it unnecessary that the yoke segments should be arranged and connected one after another while each of the teeth segments 42 and 43 are holding two or more neighboring yoke segments 21 and 22. For this reason, the yoke segments 21 connected to their corresponding teeth segments 42 and the yoke segment 22 connected to the teeth segment 43 are capable of being arranged and connected one after another. This makes it possible to assemble the stator 7 with ease.

Moreover, in the case of the brushless motor 1, the teeth segments 42 and 43 are connected to their corresponding yoke segments 21 and 22 by pressing the press-fit projected portions 45 of each of the teeth segments 42 and 43 to fit into the respective press-fit grooves 23 of its corresponding one of the yoke segments 21 and 22. This connecting scheme makes it possible to check loss of the lines of magnetic force between the teeth segments 42 and their corresponding yoke segments 21 and between the teeth segment 43 and the yoke segment 22. In particular, this connecting scheme makes it possible to check the loss of the lines of magnetic force more than the connecting scheme in which each neighboring two of the yoke segments 21 and 22 are connected to each other by pressing fit. That is because the teeth segments 42 and 43 as well as the yoke segments 21 and 22 have many connecting points, at which the teeth segments 42 are connected to their corresponding yoke segments 21 by pressing fit whereas the teeth segment 43 is connected to the yoke segment 22 by pressing fit.

Additionally, in the case of the brushless motor 1, the distance between the rotor 3 and each of the two end portions of the front end portion 47 of each tooth 41 where the lines of magnetic force changes more while the rotor 3 is rotating is designed to be longer than the distance between the rotor 3 and the center portion in the front end portion 47 of the tooth 41 where the lines of magnetic force changes less while the rotor 3 is rotating. This design makes it possible to reduce cogging torque.

In the case of the brushless motor 1, the yoke section 20 is capable of being positioned by causing the guide portions 27 of the yoke section 20 to abut on the inner surface of the outer peripheral portion 12e of the case segment 12. This makes it possible to easily arrange the yoke section 20 in the predetermined position in the case segment 12.

In addition, the brushless motor 1 is assembled using the teeth segments 42 and 43, each of which are beforehand separated away from each other. This assembling scheme makes it possible to eliminate a cutting step of separating the teeth segments 42 and 43 away from each other after the stator is assembled. As a result, it is possible to simplify the manufacturing process. In addition, the connecting of the teeth 41 one after another makes it possible to check shift of the teeth section 40 relative to the yoke section 20, which would otherwise occur due to vibrations or the like. Concurrently, this connecting scheme makes it possible to reduce the number of parts.

Furthermore, in the case of the brushless motor 1, each two neighboring teeth 41 are connected to each other at their parts only in the rotational axis direction by use of the three corresponding connecting parts 44. This connecting scheme makes it possible to check leakage of the lines of magnetic force between each two neighboring teeth 41, and to accordingly check deterioration of characteristics of the motor. In addition, the three connecting parts 44 are formed between each two neighboring teeth 41 with the regular distance provided between each neighboring two of the three connecting parts 44. This formation scheme makes it possible to increase the strength with which each neighboring two of the teeth 41 are connected to each other in comparison with a formation scheme in which one connecting part is formed in a single location in a concentrated manner. That is because this formation scheme makes it possible to disperse force working between each neighboring two of the teeth 41 among the corresponding three connecting parts 44. Additionally, this formation scheme makes it possible to construct each of the connecting parts 44 with the smaller thickness in the rotational axis direction, and to accordingly check leakage of the lines of magnetic force between each two neighboring teeth 41.

In the case of the brushless motor 1, the teeth section 40 has the structure in which the teeth plates 49 and 50 are laminated. Thereby, the teeth section 40 is capable of securing its strength almost equal to that of a teeth section which is formed of a single plate, and which is as thick as the teeth section 40. The teeth section 40 is concurrently capable of checking an eddy current which would otherwise be generated in the teeth section 40. This makes it possible to check electrical energy loss.

Furthermore, the brushless motor 1 checks the eddy current by use of the structure in which the two teeth plates 49 are laminated into each of the connecting parts 44. For this reason, even if the teeth plates 49 are formed of the thin iron plates, it is possible to secure the strength for each of the connecting parts 44.

Moreover, in the case of the brushless motor 1, one end portion of each of the press-fit grooves 23 in the yoke section 20 into which their corresponding press-fit projected portions 45 of the teeth section 40 are pressed to fit is closed by its closing wall 24, whereas the other end portion of the press-fit groove 23 is closed by its corresponding closing rib 12a in the case segment 12. This closing scheme enables each of the teeth 41 to be pressed by at least one of, or both of, its corresponding closing wall 24 and its corresponding closing rib 12a while the stator 7 is being fixed by use of the fixing screws 60. This makes it possible to check the shift of the teeth section 40 relative to the yoke section 20 due to the vibration of the motor or the like, and to accordingly prevent the teeth section 40 from jutting out from, or coming off from, the press-fit grooves 23.

Additionally, the brushless motor 1 has the structure in which the yoke section 20 is formed by laminating the yoke plates 29 and 30. This structure makes it possible to check an eddy current which would otherwise occur. This makes it possible to check an electrical energy loss which would otherwise occur in the yoke section 20. In addition, even if the yoke plates 29 are produced by use of the thin iron plates for the purpose of checking the eddy current, it is possible to secure the strength for each of the closing walls 24, because each of the closing walls 24 is formed by laminating the two yoke plates 29.

In the case of the brushless motor 1, the yoke section 20 is formed of the yoke plates 29 and the yoke plates 30 which are of two different types. Nevertheless, the yoke plates 30 can be produced through producing the yoke plates 29 by punching out iron plates by use of the dies, and thereafter forming the press-fit grooves 23 by further punching out the areas corresponding to the closing walls 24. As a result, this production scheme makes it possible to easily produce the yoke plates 29 and the yoke plates 30 which are of the two different types.

Moreover, in the case of the brushless motor 1, the closing ribs 12a are formed by causing only parts of the inner bottom surface 12d to jut out corresponding to the teeth 41, instead of forming a closing rib throughout the inner surface of the case segment 12. This formation scheme enables the teeth 41 to be pressed better. Furthermore, the closing ribs 12a are arranged in order that each of the teeth segments 42 and 43 is pressed by the two closing ribs 12a, instead of correspondingly providing one closing rib 12a to each of the teeth 41. This arrangement scheme makes it possible to check the shift of the teeth section 40, and to concurrently reduce the closing ribs 12a in number. This makes it possible to reduce the amount of the material of which the case segment 12 is formed. This resultantly makes it possible to cut back costs of the material for the case 2, and to concurrently reduce the weight of the case 2.

The present invention has been described in detail by use of the embodiment. However, the present invention is not limited to the embodiment which has been described in the specification. The scope of the present invention shall be determined based on the descriptions in the scope of claims and the scope equivalent to the descriptions in the scope of claims. Descriptions will be provided next for modifications obtained by modifying parts of the embodiment.

The example of the application of the present invention to the three-phase inner rotor type brushless motor for electric motorcycles has been cited for the foregoing embodiment. Nevertheless, the present invention is capable of being applied to a different type of motors which are used for another type of electric bicycles, household electrical appliances and the like.

Figure 16:
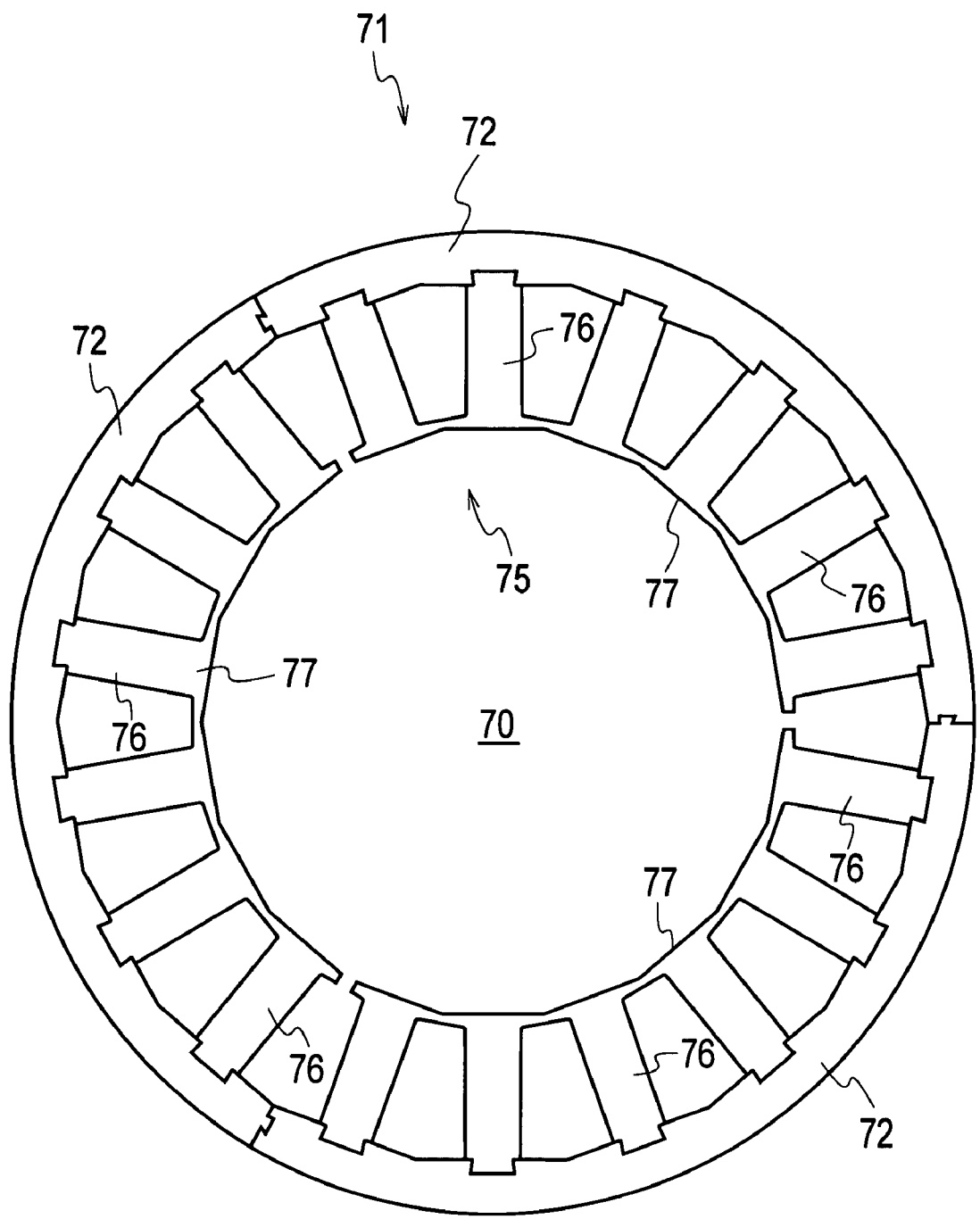
FIG. 16 is a plan view of a stator according to a modification.
Figure 17:
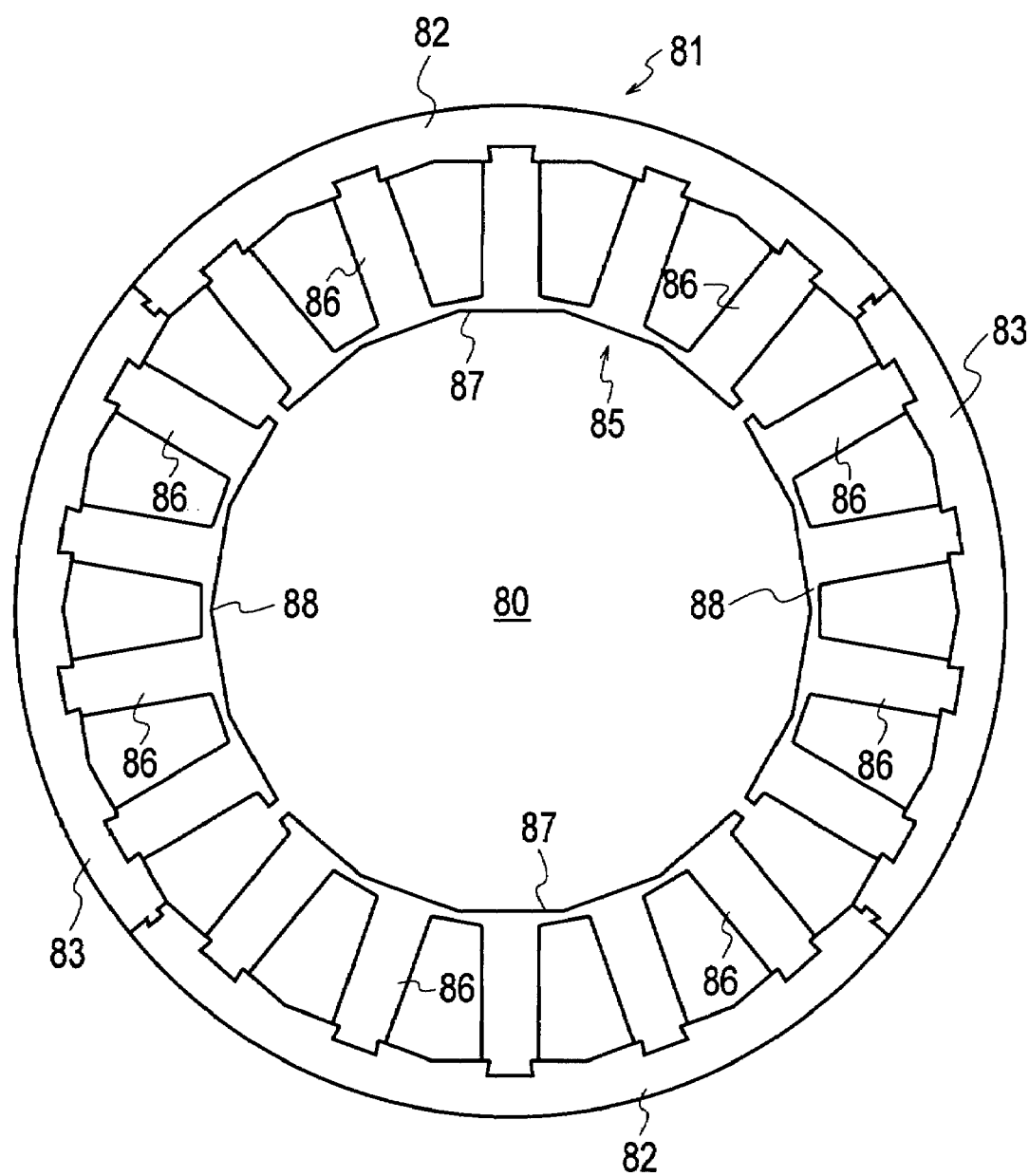
FIG. 17 is a plan view of a stator according to another modification.

The yoke segments 21 and 22 as well as the teeth segments 42 and 43 can be changed in number in accordance with necessity. For example, as in the case of a stator 70 shown in FIG. 16, a yoke section 71 may be configured of three yoke segments 72 whereas a teeth section 75 may be configured of three teeth segments 77 each having 6 teeth 76. Otherwise, as in the case of a stator 80 shown in FIG. 17, a yoke section 81 may be configured of four yoke segments 82 and 83 whereas a teeth section 85 may be configured of two teeth segments 87 each having four teeth 86. It should be noted that it is desirable that the number of the yoke segments be less than or equal to the number of the teeth segments. This configuration makes it possible to simplify the assembling of the yoke section, and to concurrently check loss of the lines of magnetic force between each neighboring two of the yoke segments. Furthermore, the increasing of the number of the teeth segments along with the decreasing of the number of connections between the teeth makes it possible to check leakage of the lines of magnetic force between each neighboring two of the teeth segments. It should be noted that at least one of the yoke section and the teeth section may be configured of its segments whereas the other of the two sections may be configured of a single part.

The motor according to the foregoing embodiment has the configuration in which each of the yoke segments 21 is paired with a corresponding one of the teeth segments 42 whereas the yoke segment 22 is paired with the teeth segment 43. However, a motor according to the present invention may have a configuration in which two teeth segments are attached to each yoke segment. Incidentally, it is desired that this motor should have a configuration in which one teeth segment be not attached to two yoke segments at the same time. This configuration makes it possible to simplify the process of assembling its stator.

Moreover, in the case of the outer rotor type motor, the inner peripheral surface of the rotor may be formed in the shape of a polygonal cylinder made up of multiple flat surfaces each normal to the radius at which the rotor rotates.

Figure 18:
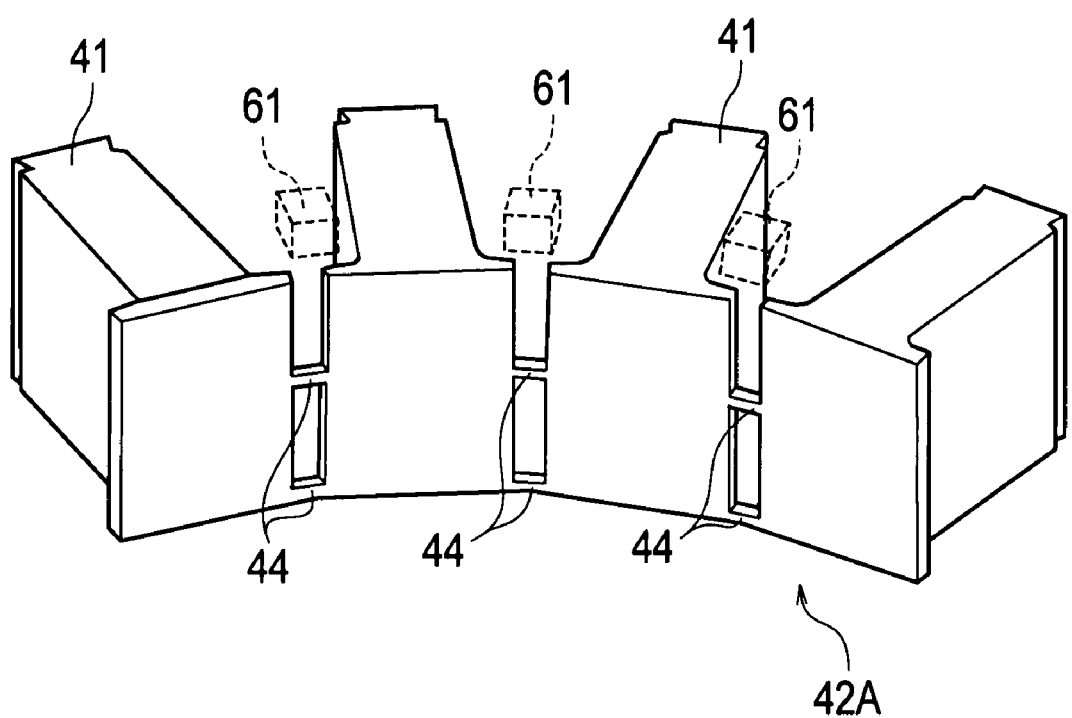
FIG. 18 is a perspective view of a modified example of the teeth segment.
Figure 19:
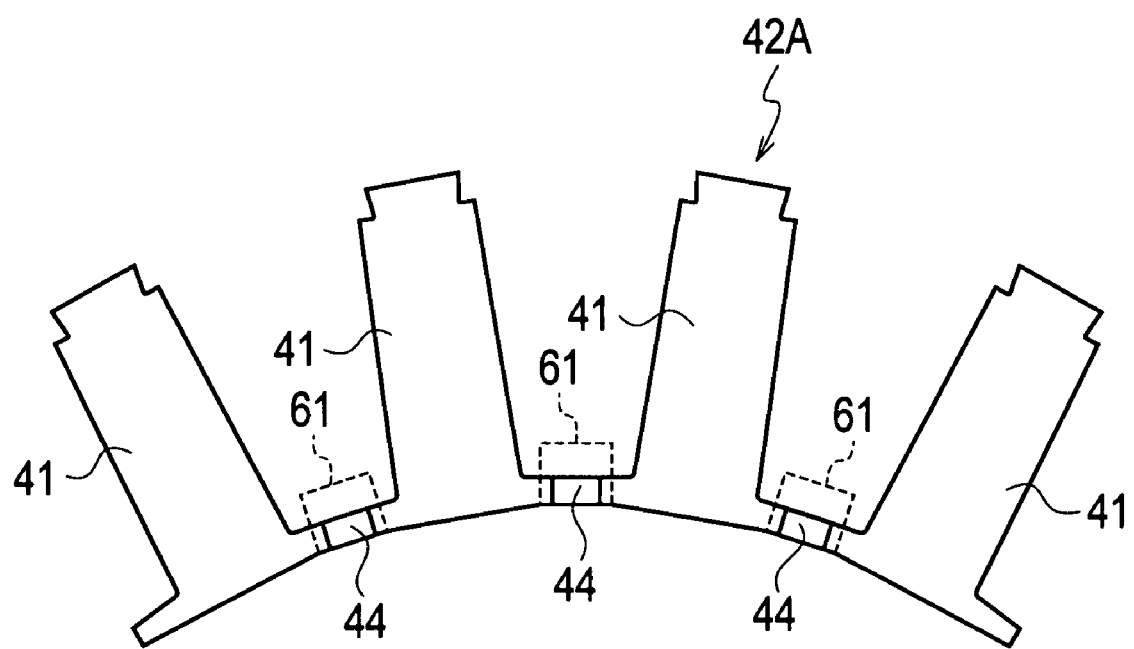
FIG. 19 is a plan view of the modified example of the teeth segment.
Figure 19:
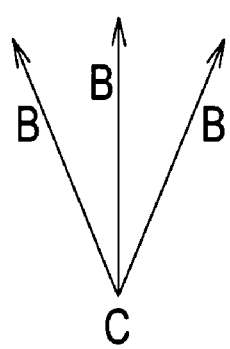

Furthermore, the number and positions of the connecting parts 44 formed in each of the teeth segments 41 and 42 may be changed in accordance with necessity. For example, two connecting parts may be provided between each two neighboring teeth 41 as in the case of a teeth segment 42A shown in FIG. 18. In this case, it is desirable that, as shown in FIG. 18, the two connecting parts 44 between each two neighboring teeth 41 should be formed only in positions other than an end portion where a magnetic sensor 61 such as a hole IC for the purpose of detecting a magnetic pole of a magnet 3a is arranged. It should be noted that, as shown in FIGS. 18 and 19, the magnetic sensor 61 between each two neighboring teeth 41 is arranged in positions in a radius direction B which passes through the connecting parts 44 and the center C of the stator 7 while viewed from the rotational axis direction (the direction perpendicular to the sheet in which FIG. 19 is drawn), and which is off the teeth 41 when viewed from the radius direction B. Furthermore, the magnetic sensor 61 may be arranged outward of the connecting parts 44 in the radius direction B as long as the magnetic sensor 61 is capable of detecting the magnetic pole of the rotor 3, although it is desirable that, as shown in FIG. 19, the magnetic sensor 61 should be arranged in a position which is as away from the center C as the connecting parts 44, or in a position which is inward of the connecting parts 44 and closer to the center C. The reason why the connecting parts between each two neighboring teeth 41 are not arranged in the vicinity of the magnetic sensor 61 in this manner is that this makes it possible to check the influence of the lines of magnetic force leaking from the connecting parts 44 on the magnetic sensor 61. It should be noted that the configuration of the teeth segment 42A with no connecting parts 44 arranged in the forgoing end portion may be applied only to teeth segments each with the magnetic sensor 61 arranged therein. Otherwise, this configuration may be applied to all of the teeth segments. Furthermore the magnetic sensor 61 may be arranged in the gap 48 formed between each two neighboring teeth segments 41 and 42.

Figure 20:
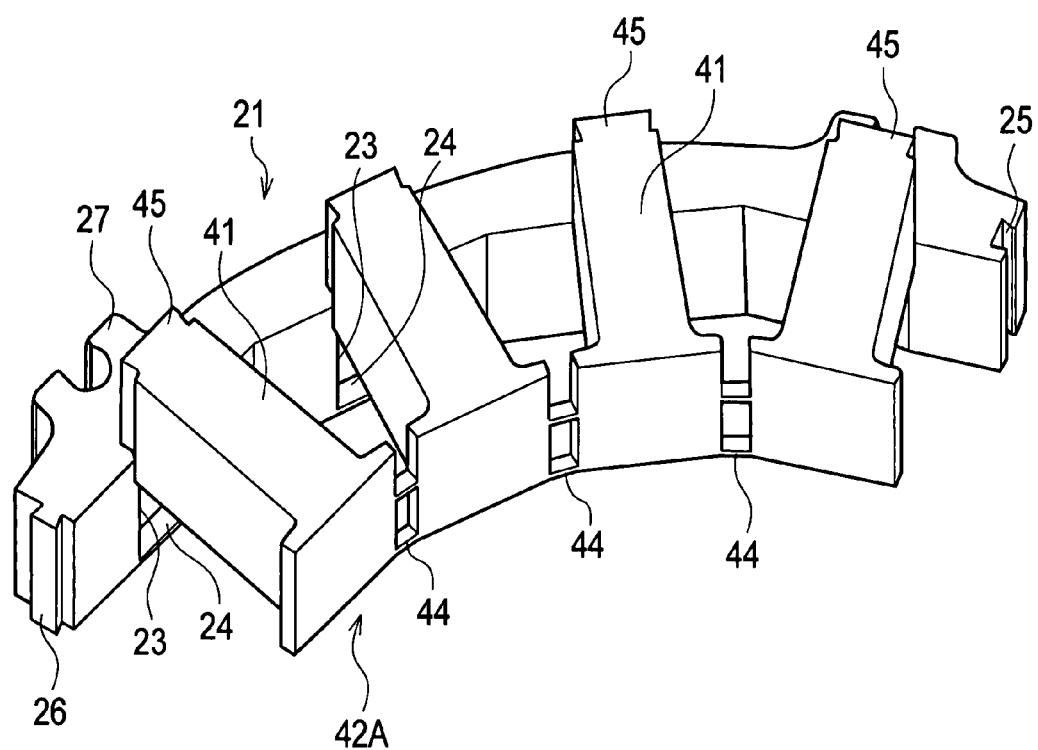
FIG. 20 is a diagram showing how the teeth segment according to the modified example is inserted into the teeth segment.

In the case of this configuration, as shown in FIG. 20, it is desirable that the press-fit projected portions 45 should be pressed to fit into their respective press-fit grooves 23 of a corresponding yoke segment 21 by inserting the press-fit projected portions 45 thereto from the side of the teeth segment 42A where the connecting parts 44 are formed between each two neighboring teeth 41. This press-fit scheme makes it possible to check the teeth segment 42A from distorting while the press-fit projected portions 45 are being pressed to fit into the press-fit grooves 23 even if the teeth segment 42A and its corresponding yoke segment 12 abut on each other in a case where the connecting parts 44 are reduced in number.

Figure 21:
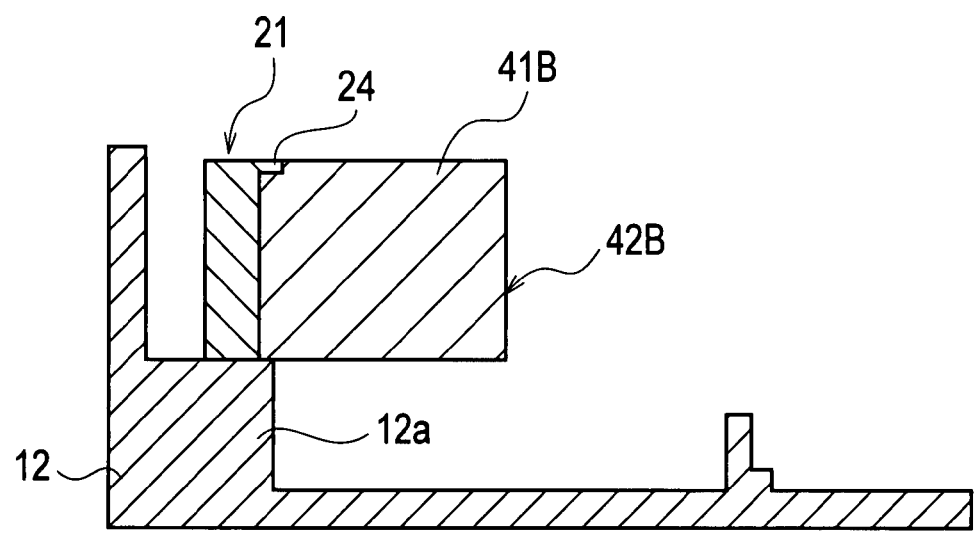
FIG. 21 is a diagram of the stator including a teeth segment according to another modified example, which is an equivalent to FIG. 14.
Figure 22:
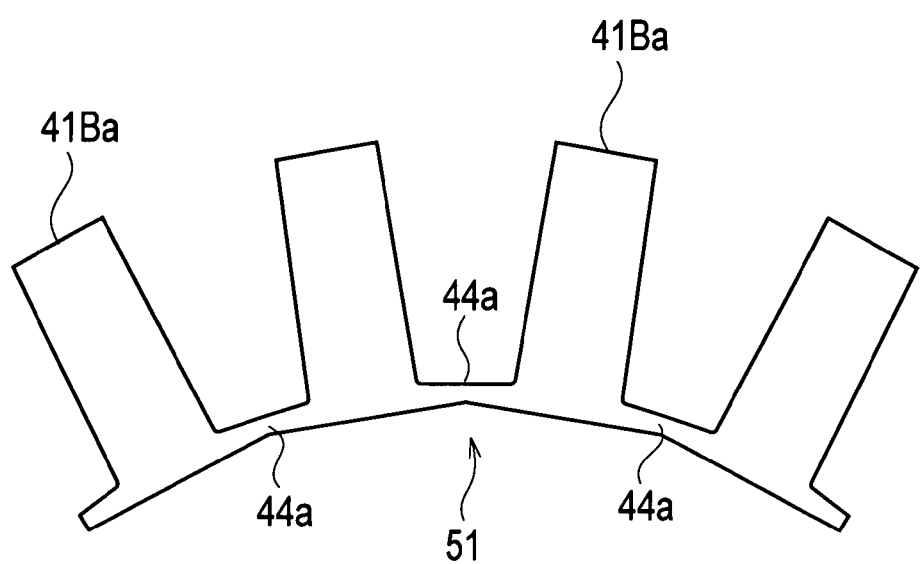
FIG. 22 is a plan view of a teeth plate constituting the teeth segment shown in FIG. 21.

In the foregoing embodiment, as shown in FIGS. 14 and 15, the step is formed between the upper end surface of each closing wall 24 and the upper end surface of its corresponding tooth 41 in the teeth segment 42. However, as shown in FIG. 21, the upper end surface of the closing wall 24 and the upper end surface of the tooth 41B in the teeth segment 42B may be configured so that the two upper end surfaces are present in the same plane. Teeth segments 42B of this type can be produced by laminating the same number of teeth plates 51 shown in FIG. 22 as the yoke plates 29 (or two teeth plates 51) on the side of each teeth segment 42 where the closing walls 24 are formed. Each of the teeth plates 51 includes: tooth-forming parts 41Ba obtained by cutting off parts constituting press-fit projected portions from the teeth plate 49 shown in FIG. 12; and the connecting-part-forming parts 44a. If the upper end surface of each closing wall 24 and the end surface of its corresponding tooth 41B of the teeth segment 42B are formed in a way that the two end surfaces are present in the same plane, and the teeth segment 42B becomes thicker. This makes it possible to enhance the characteristics of the motor.

What is claimed is:

1. A motor comprising:
    a stator including a yoke section and a teeth section including a plurality of teeth; and
    a rotor,
    wherein the teeth section and the yoke section are formed of mutually independent configuration members, and are connected to each other,
    the teeth section comprises teeth segments, wherein two adjacent teeth segments thereof being connected one to another in a direction in which the rotor rotates,
    the yoke section comprises yoke segments, wherein two adjacent yoke segments thereof being connected one to another in the direction in which the rotor rotates,
    the teeth segments having a plurality of teeth,
    in each teeth segment, at least a predetermined number of adjacent teeth are unified,
    the number of the yoke segments is equal to the number of the teeth segments,
    the yoke segments are connected to the teeth segments on a one-to one basis, and
    the teeth segments are connected to the yoke segments in a way that each teeth segment is not connected to multiple yoke segments simultaneously.

2. The motor of claim 1, wherein
    the yoke section includes a plurality of yoke segments, and each neighboring two of the plurality of yoke segments are connected to each other in a loose fitting manner.

3. The motor of claim 1, wherein
    the teeth section includes a plurality of teeth segments having the plurality of teeth, and
    a gap is formed between each neighboring two of the teeth segments.

4. The motor of claim 1, wherein the teeth section is connected to the yoke section by pressing fit.

5. A motor comprising:
    a stator including a yoke section and a teeth section including a plurality of teeth; and
    a rotor,
    wherein the teeth section and the yoke section comprise mutually independent configuration members, and are connected to each other,
    at least one teeth section and the yoke section comprise connected neighboring two segments arranged one after another in a direction in which the rotor rotates, and
    at least some neighboring teeth are unified
    wherein, in a front end portion of each of the teeth which is opposite to the rotor, the distance between the rotor and each of two end parts of the front end portion in the direction in which the rotor rotates is longer than the distance between the rotor and a central part of the front end portion in the direction in which the rotor rotates.

6. The motor of claim 1, further comprising
    a case to which the stator is attached,
    wherein, for the purpose of positioning the yoke section, guide portions which abut on the inner surface of the case are formed in the yoke section.

7. A motor comprising:
    a stator including a yoke section and a teeth section including multiple teeth as well as a plurality of connecting parts;
    a rotor; and
    coils,
    wherein the teeth section and the yoke section comprise mutually independent configuration members, and are connected to each other, and
    at least some neighboring teeth are unified with a part of the teeth in the rotational axis direction of the rotor by use of their corresponding connecting parts in positions closer to the rotor than their corresponding respective coils,
    the motor further comprising a magnetic sensor for detecting a magnetic pole of the rotor, the magnetic sensor being arranged in a position in a direction in which the radius of the stator extends and passes through the connecting parts when viewed from the rotational axis direction, and the position in the rotational axis direction and off the teeth when viewed from the radius direction,
    wherein, at least between two of the teeth which are closest to the magnetic sensor, the connecting parts are formed only in positions other than end portions of the teeth, the end portions being closer to the position where the magnetic sensor is arranged.

8. The motor of claim 7, wherein a plurality of connecting parts are formed in a way that one of the connecting parts is arranged at intervals of a regular distance in the direction in which the rotor rotates.

9. The motor of claim 7, wherein the teeth section comprises laminated first teeth plates each including connecting-part-forming parts each constituting one of the connecting parts between each neighboring two of the teeth as well as tooth-forming parts respectively constituting the teeth; and second teeth plates each including tooth-forming parts respectively constituting the teeth.

10. The motor of claim 7, wherein
    insertion grooves into which parts of the teeth section are inserted are formed in the yoke section,
    the connecting parts are formed in an end portion of the teeth section where the parts of the teeth section are inserted into the insertion grooves in the yoke section first.

11. A motor comprising:
a stator including a yoke section in which insertion grooves are formed and which includes closing walls, a teeth section including a plurality of teeth, and
a case including closing portions for closing one end portions of their respective insertion grooves,
wherein the teeth section and the yoke section comprise mutually independent configuration members connected to each other,
at least some neighboring teeth out of the plurality of the teeth are unified by connecting the neighboring teeth one after another by use of their corresponding connecting parts,
the insertion grooves is for connecting the yoke section and the teeth section to each other by insertion, and the closing walls is for closing other end portions of their respective insertion grooves.

12. The motor of claim 11, wherein the yoke section comprises laminated first yoke plates each having closing-wall-forming parts constituting the respective closing walls formed; and second yoke plates each having insertion-groove-forming parts constituting the respective insertion grooves formed.

13. The motor of claim 11, wherein one of each neighboring two of the teeth is connected to the other by the connecting part at least its end portion at the side of a corresponding one of the closing walls.

14. The motor of claim 11, wherein an end surface of any one of the teeth at the side of a corresponding one of the closing walls is present in the same plane as an outer end surface of the closing wail.

15. The motor of claim 11, wherein the closing portions in the case are unified in a way that the closing portions protrude inward from the case.

16. The motor of claim 11, wherein
the teeth section has a plurality of teeth segments each having the plurality of teeth, and
at least one closing portion of the case is provided to each of the teeth segments.

* * * * *